United States Patent [19]

Leroy et al.

[11] 4,040,612
[45] Aug. 9, 1977

[54] BLAST PIPE ASSEMBLY FOR THE BOTTOM PLATE OF A CONVERTER OR FURNACE FOR REFINING METALS

[76] Inventors: Pierre Leroy, 23, rue de Tourville, 78100 Saint-Germain-en-Laye; Emile Sprunck, 5, rue Joffre, 57250, Moyeuvre-Grande, both of France

[21] Appl. No.: 746,153

[22] Filed: Nov. 30, 1976

[30] Foreign Application Priority Data

Dec. 10, 1975  France .................................. 75.37802

[51] Int. Cl.² ............................................... C21C 5/48
[52] U.S. Cl. ...................................... 266/268; 266/222
[58] Field of Search ....................... 266/218, 220–224, 266/243, 245, 246, 265, 268

[56] References Cited

U.S. PATENT DOCUMENTS 3,608,880  9/1971  Gombert et al. ..................... 266/268

*Primary Examiner*—Gerald A. Dost

[57] ABSTRACT

A blast pipe assembly for mounting on attachment to and dismounting from the bottom plate means of a converter or furnace for refining metals, the plate means including a hollow cylindrical part for surrounding the blast pipe and having at its lower end portion an inner shoulder and a flange for clamping bolts, the blast pipe assembly comprises two concentric pipes for double separate feed, the inner pipe of said concentric pipes being longer than the outer pipe of said concentric pipes and the inner diameter of said outer pipe being greater than the outer diameter of said inner pipe to define a gap between said pipes for admission of fluid, the lower end of said outer pipe, which is arranged to be at the level of said shoulder of said hollow cylindrical part, being flared, said inner pipe having, at a level below the lower end of said outer pipe, a circular swelling; a hollow cylindrical injector body adapted to be arranged between said flared portion of said outer pipe and said circular swelling on said inner pipe, said injector body having a lateral inlet for fluid for feeding said gap between said pipes with fluid, at the lower end thereof an inwardly directed machined circular face for bearing in a fluid tight manner against the upper part of said circular swelling on said inner pipe.

3 Claims, 5 Drawing Figures

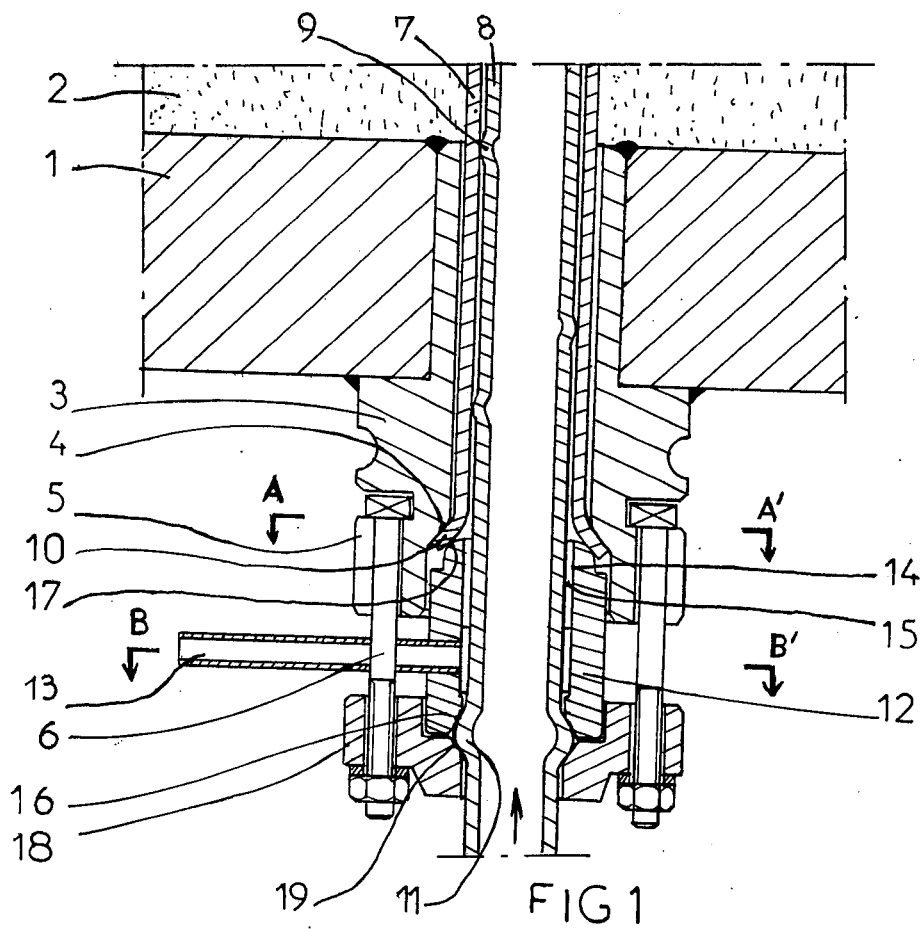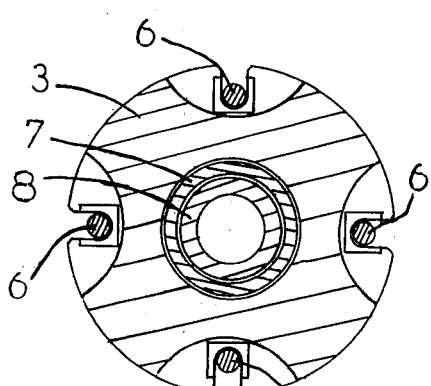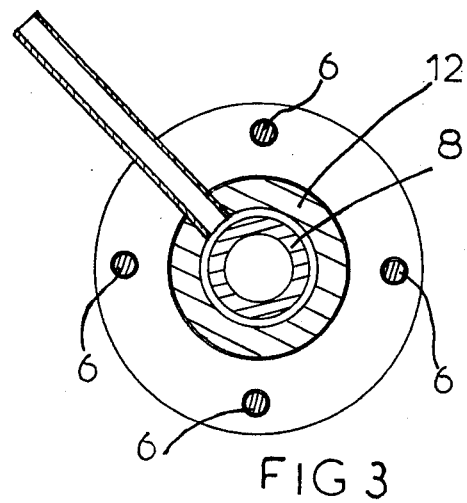

BLAST PIPE ASSEMBLY FOR THE BOTTOM PLATE OF A CONVERTER OR FURNACE FOR REFINING METALS

The present invention refers to a blast pipe assembly including a blast pipe having double separate feed and which may for example, be employed, for the refinement of metals.

For a long time steelworks converters have employed as blast medium a single gaseous phase, which is either ordinary air or air enriched with oxygen, or a rich mixture such as oxygen and steam, etc. This blown-in gaseous phase is called blast wind. It is introduced into a number of blast pipes by means of a wind box fed at a relatively low pressure, of the order of 2.5 bars. Each blast wind jet has only one feed.

More recently blast pipes have appeared having double separate feed, consisting of two concentric pipes, and for blowing in in the centre a first fluid which is in general an oxidizing gas, for example, pure oxygen, or a mixture of gases, and at the periphery a cooling and protective fluid. These two fluids are generally introduced at a pressure considerably higher than 2.5 bars.

The presence of two fluids with separate feeds in each blast pipe and also the higher pressure of the fluids make it essential to do away with the traditional wind box and to have recourse to special devices for blowing in, capable of remaining fluid tight in spite of the pressure of the fluids employed, in spite of the ambient temperature near the converters and refining furnaces, and in spite of the severe local conditions of application.

Certain such devices have already been described in French patent no. 1,555,549 and its additions nos. 94,892, 69-01640 and 69-38151, and in French patent no. 71-27760 and its addition nos. 71-37308 and 72-15476. However these devices included seals of plastics or metallo-plastic material, sensitive to temperature, not very resistant to wear, and which have to be changed frequently.

It is an object of the present invention to provide means for mounting, for attachment and for dismounting of blast pipes having double separate feed, which do not require plastics or metallo-plastic fluid tight seals, which are capable of operating with very good fluid tightness not only under the high pressures of the fluids to be introduced into the blast pipes but also at all the ambient temperatures in the immediate proximity of the converters and refining furnaces.

According to the present invention there is provided a blast pipe assembly for mounting on, attachment to and dismounting from the bottom plate means of a converter or a furnace for refining metals, the plate means including a hollow cylindrical part for surrounding the blast pipe and having at its lower end portion an inner shoulder and a flange for clamping bolts, the blast pipe assembly comprising; two concentric pipes for double separate feed, the inner pipe of said concentric pipes being longer than the outer pipe of said concentric pipes and the inner diameter of said outer pipe being greater than the outer diameter of said inner pipe to define a gap between said pipes for admission of fluid, the lower end of said outer pipe, which is arranged to be at the level of said shoulder of said hollow cylindrical part, being flared, said inner pipe having, at a level below the lower end of said outer pipe, a circular swelling; a hollow cylindrical injector body adapted to be arranged between said flared portion of said outer pipe and said circular swelling on said inner pipe, said injector body having a lateral inlet for fluid for feeding said gap between said pipes with fluid, at the lower end thereof an inwardly directed machined circular face for bearing in a fluid tight manner against the upper part of said circular swelling on said inner pipe, and towards the upper end thereof a circular round-off for bearing in a fluid tight manner against said flared portion of said outer pipe; and an annular clamping flange adapted to be arranged beneath said injector body and said swelling on said inner pipe; said clamping flange being adapted to receive the clamping bolts of the hollow cylindrical part and having an inwardly directed machined circular face for fitting against the lower part of said circular swelling on said inner pipe; the arrangement being such that the mounting, attachment and dismounting of said assembly as a whole are carried out by simple screwing up or unscrewing of the bolts.

In a preferred embodiment, the assembly includes for the making and baking of the converter bottom or of the portion of refractory wall surrounding each blast pipe assembly, before use of the blast pipe assembly wherein only the outer pipe is in position in the hollow cylindrical part and arranged thus before and during the manufacture of the bottom of the converter or of the refractory wall of the furnace, a metal stopper plug to be placed at the inner end of the outer pipe, said plug including a central head provided with a machined circular face for fitting in a fluid tight manner against said flared portion of said outer pipe, and a flange adapted to receive the clamping bolts of the hollow cylindrical part the arrangement being such that the attachment and the dismounting of said stopper plug are carried out by simple screwing up and unscrewing of the bolts.

The assembly may also include a metal protective cup for surrounding said stopper plug, said hollow cylindrical part and the clamping blots during the making and baking of the bottom or of the refractory wall, said cup being attached to side portions of said hollow cylindrical part by cotter means said cup also serving as a bearing base for the transport and the mounting of the refractory bottom in the converter or of the portion of refractory wall in the refining furnace.

The invention will be more fully understood from the following description of an embodiment thereof, given by way of example only, with reference to the accompanying drawings:

In the drawings:

FIG. 1 is a vertical section through a steel works converter double blast pipe assembly for blowing in pure oxygen through its inner pipe and receiving fuel oil between the pipes in accordance with the invention;

FIG. 2 is a horizontal section through the assembly along the line AA' in FIG. 1, FIG. 3 is a horizontal section through the assembly along the line BB' in FIG. 1.

Figure 4:
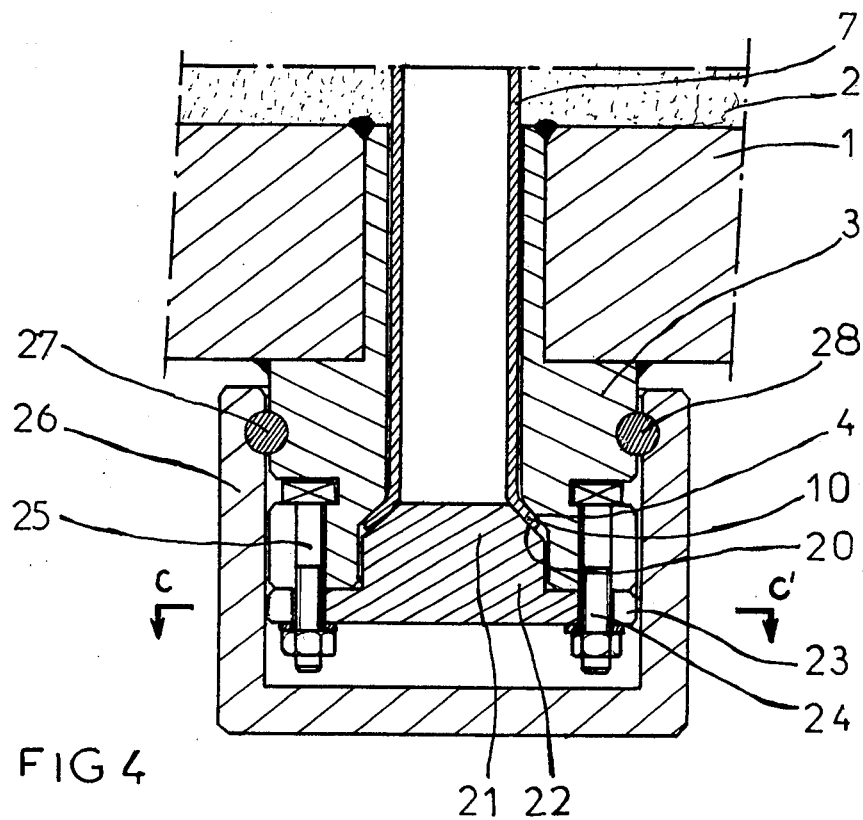
FIG. 4 is a vertical section through the outer blast pipe during the making and baking of the refractory bottom.

A blast pipe assembly in accordance with the invention will first be described with reference to FIGS. 1, 2 and 3.

The bottom plate 1 supporting the bottom 2 of tarred dolomite includes a hollow part of revolution 3 which is welded to it, called the "scabbard," and through which the double blast-pipe extends.

The lower end of the scabbard 3 has an inner shoulder 4 and a flange 5 equipped with four bolts 6, the distribution of which may be seen in FIGS. 2 and 3.

The central hollow portion of the scabbard 3 leaves a way free for the double blast-pipe consisting of two concentric pipes, an outer pipe 7 and an inner pipe 8 the separation of the two pipes being small (less than a millimeter) and strictly maintained along the whole length of the blast pipe by bosses 9.

At its bottom end the outer pipe 7 has a flared portion 10 which is fitted against the shoulder 4 on the scabbard 3.

At a level below that of this flared portion 10 of the outer pipe 7 the inner pipe 8 has a circular swelling 11.

Between the flared portion 10 of the outer pipe 7 and the circular swelling 11 on the inner pipe 8 an injector body 12 is arranged. The body 12 is a hollow cylindrical body which receives fuel oil from the side through a pipe 13, formed between the inner surface 14 of its wall and the outer face of the inner pipe 8 a free space for the flow of the fuel oil, has at the bottom, turned towards the inside a machined circular face 16 capable of being fitted in a fluid tight manner against the upper part of the circular swelling 11 on the inner pipe 8, and has at its top end a circular rounded end edge 17 capable of bearing in a fluid tight manner against the flared portion 10 of the outer pipe 17.

Underneath the injector body 12 and underneath the swelling 11 an annular clamping flange 18 is arranged which receives the four bolts 6 and has towards the inside a machined circular face 19 which fits against the bottom of the swelling 11.

Mounting, attachment and dismounting of the whole of the device is carried out by simple screwing up or unscrewing the four bolts 6.

Oil tightness of the assembly in relation to the fuel oil coming in through the pipe 13 and being distributed through the free space 15 in the outer pipe 7 is ensured at faces 16 and 17 by contact between metal surfaces under the mechanical pressure caused by the tightening of the four bolts 6.

Figure 5:
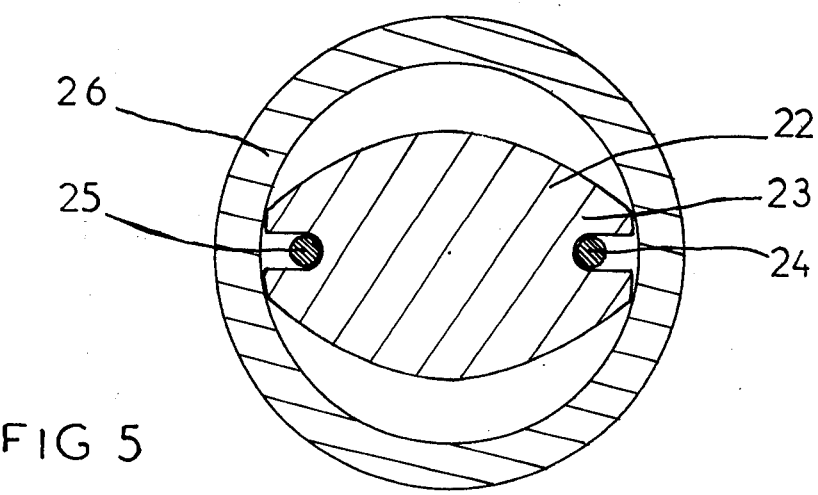
FIG. 5 is a section along the line CC' in FIG. 4.

In FIGS. 4 and 5 there is shown the device for attachment of the outer pipe 7 for the making and baking of the refractory bottom 2, before the inner pipe 8 is introduced and the complete device assembled, hence before the bottom and the blast pipes are put into use.

Here again the flared portion 10 of the bottom end of the outer pipe 7 is fitted against the shoulder 4 on the scabbard 3 by pressure of the machined circular face 20 on the central cylindrical head 21 of a metal stopper plug 22, the flange 23 of which, shown clearly in FIG. 5, has an oblong shape and is tightened by screwing up two bolts 24 and 25.

A metal protective cup 26 is attached to the side portions of the scabbard 3 by means of two cotters 27 and 28.

After making and baking of the refractory bottom 2, at the time of putting the bottom into service for blowing into steel melts, the two cotters 27 and 28 are knocked out and the cup 26 can thus be removed.

Then the two bolts 24 and 25 are unscrewed and the stopper plug 22 is withdrawn.

It is then possible to insert the inner pipe 8 into the outer pipe 7, the inner pipe 8 being equipped with the injector body 12, and then to put the clamping flange 18 into position. Then the whole can be rigidly attached by screwing up the four bolts 6.

There is thus provided a blast pipe assembly in which fluid tightness is maintained not only under the high pressure but also at any of the ambient temperatures usual in steelworks, without any interchangeable fluid tight seal. The assembly is also quick and easy to mount and dismount.

The temporary stopper plug for the outer pipe and its protective cup enables easy making and baking of the bottom of the converter, the outer pipe of each blast pipe being at that time in position and serving as a core to the refractory material constituting the bottom, the lower end of the pipe being well protected against the introduction of any foreign body, whilst the protective cup constitutes at one end the same time a protection and a seating during the course of transport.

When the blast pipe assembly is to be put into service it is easy to remove the protective cup, then the stopper plug, then to thread in the inner pipe, the injector body and the annular clamping-flange, and to attach the whole by tightening the bolts onto the hollow cylindrical part.

What is claimed is:

1. A blast pipe assembly for mounting on, attachment to and dismounting from the bottom plate means of a convertor or a furnace for refining metals, the plate means including a hollow cylindrical part for surrounding the blast pipe and having at its lower end portion an inner shoulder and a flange for clamping bolts, the blast pipe assembly comprising;

two concentric pipes for double separate feed, the inner pipe of said concentric pipes being longer than the outer pipe of said concentric pipes and the inner diameter of said outer pipe being greater than the outer diameter of said inner pipe to define a gap between said pipes for admission of fluid, the lower end of said outer pipe, which is arranged to be at the level of said shoulder of said hollow cylindrical part, being flared, said inner pipe having, at a level below the lower end of said outer pipe, a circular swelling;

a hollow cylindrical injector body adapted to be arranged between said flared portion of said outer pipe and said circular swelling on said inner pipe, said injector body having a lateral inlet for fluid for feeding said gap between said pipes with fluid, at the lower end thereof an inwardly directed machined circular face for bearing in a fluid tight manner against the upper part of said circular swelling on said inner pipe, and towards the upper end thereof a circular round-off for bearing in a fluid tight manner against said flared portion of said outer pipe; and an annular clamping flange adapted to be arranged beneath said injector body and said swelling on said inner pipe, said clamping flange being adapted to receive the clamping bolts of the hollow cylindrical part and having an inwardly directed machined circular face for fitting against the lower part of said circular swelling on said inner pipe;

the arrangement being such that the mounting, attachment and dismounting of said assembly as a whole are carried out by simple screwing up or unscrewing of the bolts.

2. A blast pipe assembly as claimed in claim 1, including the making and baking of the converter bottom or of the portion of refractory wall surrounding each blast pipe assembly, before use of the blast pipe assembly wherein the outer pipe is in position in the hollow cylindrical part and arranged thus before and during the manufacture of the bottom of the converter or of the refractory wall of the furnace, a metal stopper plug to be placed at the lower end of the outer pipe, said plug including a central head provided with a machined circular face for fitting in a fluid tight manner against said flared portion of said outer pipe, and a flange adapted to receive the clamping bolts of the hollow cylindrical part the arrangement being such that the attachment and the dismounting of said stopper plug are carried out by simple screwing up and unscrewing of the bolts.

3. A blast pipe assembly as claimed in claim 2, including a metal protective cup for surrounding said stopper plug, said hollow cylindrical part and the clamping bolts during the making and baking of the bottom or of the refractory wall, said cup being attached to side portions of said hollow cylindrical part by cotter means said cup also serving as a bearing base for the transport and the mounting of the refractory bottom in the converter or of the portion of refractory wall in the refining furnace.

* * * * *